(12) United States Patent
Hayashi et al.

(10) Patent No.: US 7,764,428 B2
(45) Date of Patent: Jul. 27, 2010

(54) OPTICAL ELEMENT, OPTICAL SYSTEM, AND WAVEGUIDE

(75) Inventors: Masatoshi Hayashi, Fujisawa (JP); Atsushi Katsunuma, Saitama-ken (JP)

(73) Assignee: Nikon Corporation, Tokyo (JP)

( * ) Notice: Subject to any disclaimer, the term of this patent is extended or adjusted under 35 U.S.C. 154(b) by 613 days.

(21) Appl. No.: 11/630,225

(22) PCT Filed: Jun. 15, 2005

(86) PCT No.: PCT/JP2005/011391

§ 371 (c)(1),
(2), (4) Date: Dec. 20, 2006

(87) PCT Pub. No.: WO2006/001286

PCT Pub. Date: Jan. 5, 2006

(65) Prior Publication Data

US 2008/0068719 A1    Mar. 20, 2008

(30) Foreign Application Priority Data

Jun. 23, 2004   (JP) ............................ 2004-184455

(51) Int. Cl.
*G02B 27/10*    (2006.01)
(52) U.S. Cl. ....................................... 359/619; 359/626
(58) Field of Classification Search ................. 359/619, 359/622, 623, 626; 385/33, 34, 39, 50; 398/88, 398/39, 212
See application file for complete search history.

(56) References Cited

U.S. PATENT DOCUMENTS 7,004,645 B2 *    2/2006   Lemoff et al. .................. 385/89

(Continued)

FOREIGN PATENT DOCUMENTS

CN    1107236 C    4/2004

(Continued)

OTHER PUBLICATIONS

Chinese Office Action dated Feb. 15, 2008 and partial English translation thereof issued in counterpart Chinese Appln. No. 200580020930.2.

*Primary Examiner*—Alicia M Harrington
(74) *Attorney, Agent, or Firm*—Frishauf, Holtz, Goodman & Chick, P.C.

(57) ABSTRACT

The light beam 5a emitted from a light source Pa is formed into a parallel light beam 6a upon entering the substrate 1 as a result of the effect of lens strips 2a. The parallel light beam 6a reaches the end surface on the emission side of the substrate 1, and is there subjected to the effect of lens strips 3a so that this light beam is focused at a focal position Qa (focal point) on the rear side of the lens strips 3a. Similarly, the light beam 5b emitted from a light source Pb is subjected to the effect of lens strips 2b and is formed into a parallel light beam 6b inside the substrate 1; this light beam is then further subjected to the effect of lens strips 3b, and is therefore focused at a focal point Qb located in a position that is separated from the surface of the substrate 1 by a distance of f. The y direction positions of the light source Pa and the focal points Qa and Qb are respectively shifted by a distance equal to the spacing between the axis of rotational symmetry 4a of the lens strips 2a and 3a and the axis of rotational symmetry 4b of the lens strips 2b and 3b.

27 Claims, 12 Drawing Sheets

U.S. PATENT DOCUMENTS

2006/0165351 A1 7/2006 Hamanaka et al.

FOREIGN PATENT DOCUMENTS

| JP | 10-62605 A | 3/1998 |
| JP | 10-246838 A | 9/1998 |
| JP | 11-317836 A | 11/1999 |
| JP | 2002-40284 A | 2/2002 |
| JP | 2004-70310 A | 3/2004 |
| JP | 2004-70311 A | 3/2004 |
| WO | WO 03/107055 A1 | 12/2003 |

* cited by examiner (a)

(b)

(a)

(b)

(a)

(b)

(a)

(b) Incident light    Emitted light

OPTICAL ELEMENT, OPTICAL SYSTEM, AND WAVEGUIDE

This application is a U.S. National Phase Application under 35 USC 371 of International Application PCT/JP2005/011391 filed Jun. 15, 2005.

TECHNICAL FIELD

The present invention relates to an optical element which has the function of altering the light path, an optical system using this optical element, which can easily reduce the spacing of the light emission openings in a waveguide by making it possible for the light output from this waveguide to be received by a concentrated optical fiber array, and a waveguide using this optical element, which can be made compact.

BACKGROUND ART

As optical communications have developed, it has become necessary to cause light transmitted through a single optical fiber to branch into a plurality of optical fibers, and to cause light transmitted through a plurality of optical fibers to be collected in a single optical fiber. Waveguides have been used for this purpose. For example, an outline of a waveguide is described in Japanese Patent Application Laid-Open No. H10-246838.

Meanwhile, optical fibers are generally fibers in which a naked optical fiber with a diameter of approximately 125 µm consisting of a core and cladding is protected by a covering with a diameter of approximately 250 µm. Accordingly, in cases where optical fibers are lined up side by side in a single row, the spacing of the cores is approximately 250 µm, so that the spacing of the light emission openings of the corresponding waveguide is also a pitch of approximately 250 µm.

In this case, however, the size of the waveguide is increased, so that the cost of the waveguide is increased by a corresponding amount. Accordingly, in order to make waveguides more compact, there have been attempts to strip the covering from the portions of the optical fibers facing the waveguide so that naked optical fibers are produced, and to line these optical fibers up in a single row so that the spacing is adjusted to approximately 125 µm, thus adjusting the spacing of the light emission openings of the waveguide to approximately 125 µm. Various methods have been proposed for this.

Typical methods are the methods described in Japanese Patent Application Laid-Open No. H10-246838 and Japanese Patent Application Laid-Open No. 2002-40284. In these methods, the covering is removed from the end parts of the optical fibers, and the naked optical fibers are fastened in V grooves formed at a pitch of 125 µm. In this case, the V grooves are formed by etching quartz, Pyrex (registered trademark), or the like.

As was described above, however, in cases where the covering is stripped from the end parts of optical fibers having a covering with an external diameter of approximately 250 µm and it is attempted to line up the optical fibers as naked optical fibers at a spacing of approximately 125 µm, there are problems in strength if the naked optical fiber portions are lengthened. Accordingly, the length of these portions is limited. Consequently, bending stress is generated in the naked optical fiber portions, and such stress causes damage. Furthermore, in the substrate in which the V grooves are formed, it is necessary to work quartz, Pyrex, or the like by etching with a high degree of precision, so that the problem of high cost also arises.

DISCLOSURE OF THE INVENTION

The present invention was devised in light of the above circumstances; it is an object of the present invention to provide an optical system which makes it possible to arrange naked optical fibers in a staggered configuration in two tiers by using an optical element that has a light path shifting function, so that bending stress tends not to be generated in the naked optical fiber portions, an optical element which can be used in various types of light path shifting including such an optical system, and a waveguide which uses such an optical element, and which can be made compact.

The first invention that is used to achieve the object described above is an optical element that optically couples a plurality of optical members in which the pitch of the light introduction or emission openings is different, wherein lenses each of which has at least the partial shape of a rotationally symmetrical surface, and in which the shape of this rotationally symmetrical surface is maintained in at least the region where the light beams from the optical members pass through are paired so that the axes of rotational symmetry of the rotationally symmetrical surfaces are the same, and a plurality of such pairs are formed in a staggered configuration on both surfaces of a substrate so that the positions are shifted in one direction.

In the present specification and claims, the expression "in which the shape of this rotationally symmetrical surface is maintained in at least the region where the light beams from the optical members pass through" means that there need not be a specified lens surface shape in portions through which light beams from the optical member do not pass. For example, this includes lenses whose dimension in the width direction is reduced by cutting each lens having a circular shape (when viewed in a plan view) by two parallel planes leaving the portion that includes the center, thus forming a semicircular shape.

In the following description, for the sake of convenience, the direction of the optical axis (this also coincides with the direction of the axis of rotational symmetry of the lens surfaces) will be referred to as the z direction, the direction in which the lenses are lined up will be referred to as the x direction, and the direction perpendicular to the optical axis and the direction in which the lenses are lined up will be referred to as the y direction, so that the system is expressed as an x-y-z orthogonal coordinate system. Since the lenses forming pairs are arranged in a staggered configuration in the x direction, the y direction position of the optical axis differs in every other lens.

When light emitted from a certain point is caused to be incident on one of the lenses forming a pair, this light is focused as an image on the opposite side of the substrate from the side on which the light is incident as a result of the effect of the paired lenses. Assuming that the principal rays of the light incident on the respective paired lenses are parallel to each other, and that the positions in the direction of the y axis where the principal rays are incident are the same, then, as viewed from the respective lenses, the principal rays of the respective light beams are incident in different positions in the y direction from the optical axis of the lens in every other lens. Accordingly, the y direction position of the point where an image is focused as a result of the effect of the paired lenses differs. Consequently, if this optical element is used, in cases where light from light sources lined up in a row in the x direction is incident on the respective lenses, the light from these light sources can be focused at points lined up in a staggered configuration on the exit side.

Furthermore, the lenses may be lenses that are formed from a resin or the like on the substrate, or may be lenses that are integrated with this substrate. This is also true regarding the optical element described in the present specification and claims.

In the present invention, it is even more desirable to use aspherical lenses. The reason for this is that if spherical lenses are used, the geometric optical aberration the geometrical aberration is increased, so that the efficiency of coupling to single-mode optical fibers drops. Accordingly, aspherical lenses are used in order to avoid this. This is also true of other inventions.

The second invention that is used to achieve the object described above is the first invention, wherein the thickness of the substrate is set so that the focal positions of the paired lenses coincide with each other.

In this invention, for example, if it is assumed that the principal rays of the incident light are parallel to the optical axes of the lenses, and that the z direction position of the light source of the incident light is a position that is separated from each lens by the focal distance, then this optical system is an entry-side telecentric optical system. The light from the light source is a parallel light beam inside the substrate, and the intersection point of the principal ray and the optical axis of lenses can be located in the entry-side lens focal distance position. The light forming a parallel light beam is focused by the exit-side lenses; since the crossed point of the principal ray and the optical axis of the lenses is located in the front-side focal position of each exit-side lens, the principal rays are parallel to the optical axes, so that an exit-side telecentric optical system is constructed.

Thus, since a symmetrical optical system that is telecentric on both the entry and exit sides can be realized using the optical element of the present invention, the generation of aberration in the optical system can be reduced.

The third invention that is used to achieve the object described above is the second invention, wherein the focal distances of the paired lenses are equal.

In this invention, since the focal distances of the paired lenses formed on both surfaces of the substrate are equal, the incident-side aperture angle and exit-side aperture angle can be made equal. In cases where light is relayed, it is often desirable that the light be relayed while maintaining the aperture angle at the same value. Such a desirable optical system can be realized using the present invention.

The fourth invention that is used to achieve the object described above is an optical element that optically couples a plurality of optical members in which the pitch of the light introduction or emission openings is different, wherein lenses each of which has at least the partial shape of a rotationally symmetrical surface, and in which the shape of this rotationally symmetrical surface is maintained in at least the region where the light beams from the optical members pass through are formed in a staggered configuration on one surface of a substrate so that the positions are shifted in one direction, and two unit optical elements each having these lenses formed thereon are joined so that the surfaces of these two unit optical elements on which lenses having the partial shape of rotationally symmetrical surfaces are not formed contact each other, and so that the axes of rotational symmetry of the rotationally symmetrical surfaces formed on the unit optical elements coincide.

This invention has a configuration in which an element equivalent to the first invention is formed by joining unit optical elements having a structure in which the substrate of the first invention is split in two in an appropriate part. Accordingly, this invention exhibits an operational effect equivalent to that of the first invention.

The fifth invention that is used to achieve the object described above is the fourth invention, wherein the sum of the thicknesses of the respective substrates of the unit optical elements is set so that the focal positions of the lenses whose axes of rotational symmetry agree coincide with each other.

The sixth invention that is used to achieve the object described above is the fifth invention, wherein the focal distances of the lenses in which the axes of rotational symmetry coincide are equal.

These fifth and sixth inventions exhibit operational effects equivalent to those of the second and third inventions, respectively.

The seventh invention that is used to achieve the object described above is any of the first through sixth inventions, wherein the shape of the rotationally symmetrical surface is expressed by Equation (1) below:

$$z = \frac{r^2/R}{1 + \sqrt{1 - (1+\kappa) \cdot r^2/R^2}} \quad (1)$$

Here, r is the distance in the direction perpendicular to the axis of rotational symmetry, z is the amount of sag in the direction of the optical axis of the aspherical surface, R is the curvature radius of the apex of the aspherical surface, and κ is a conical coefficient (κ<−1).

Generally, the shape of an aspherical lens is expressed by adding a polynomial equation of $r^2$ to Equation (1). In this case, the optical characteristics are better, but the working is complicated by a corresponding amount. In the first through sixth inventions, expression by Equation (1) is sufficient. In cases where κ<−1, the surface is a hyperboloidal surface; in this way, the aberration can be reduced.

The eighth invention that is used to achieve the object described above is any of the first through seventh inventions, wherein the lenses having the partial shape of a rotationally symmetrical surface have a length in the direction perpendicular to the direction of arrangement of the lenses that is long with respect to the width in the direction of arrangement of the lenses.

There are cases in which it is necessary to obtain a sufficiently large light beam from an optical member in which the pitch of the light introduction openings is broad, or to supply a sufficiently large light beam to an optical member in which the pitch of the light emission openings is broad, while matching the pitch of the lenses with an optical member in which the pitch of the light introduction or emission openings is narrow. In the present invention, the length in the direction perpendicular to the direction of lens arrangement is long with respect to the width in the direction of lens arrangement; accordingly, in such cases as well, the width of the lenses can be made narrow in the direction of lens arrangement, so that lenses having the partial shape of a specified rotationally symmetrical surface can be matched with an optical member in which the pitch of the light introduction or emission openings is narrow.

The ninth invention that is used to achieve the object described above is an optical system in which the optical member having light introduction or emission openings lined up in a single row and an optical fiber array whose diameter is greater than the pitch of the light introduction or emission openings of this optical member are installed on either side of the optical element according to claims 1 through 8, wherein (1) the respective light introduction or emission openings of the optical member are disposed corresponding to the lenses having the partial shape of a rotationally symmetrical surface in the optical element,
(2) the positions of the optical axes of the respective light introduction or emission openings of the optical member in the direction of arrangement of the lenses coincide with the centers of the corresponding lenses having the partial shape of a rotationally symmetrical surface, and the positions of the optical axes of the respective light introduction or emission openings of the optical member in the direction perpendicular to the direction of arrangement of the lenses having the partial shape of a rotationally symmetrical surface are located in intermediate positions between the axes of rotational symmetry of two adjacent lenses among the lenses arranged in a staggered configuration,
(3) the respective light introduction or emission openings of the optical member are disposed in positions that are separated from the corresponding lenses by the focal distance of these lenses, and
(4) the optical fiber array is staggered in two tiers corresponding to the lenses, and the end surface of this optical fiber array is disposed in the position where the light emitted from the waveguide is focused via the optical element.

In this invention, the respective lens pairs are disposed in positions corresponding to the light introduction or emission openings of the optical member (it goes without saying that the number of lens pairs may be greater than the number of light introduction or emission openings of the optical member, so that there may be lens pairs that are not used; the present invention includes such configurations).

In the present invention, the optical axes (principal rays) of the light that is introduced into the respective light introduction openings of the optical member or the light that is emitted from the respective light emission openings are located in intermediate positions between the y direction positions of the axes of rotational symmetry of the staggered lenses in the y direction positions where the light is incident on the lenses (since a staggered arrangement is used, there are two different types of positions in the direction of the y axis). Accordingly, as seen from the respective lenses, the positions of the optical axes of the light incident on the optical axes of the lenses are shifted in the direction of the y axis in every other lens, and the exit-side focal points are staggered as a result of the effect of the optical element.

Accordingly, the respective optical fibers making up the optical fiber array that receives the light emitted from the optical element can be arranged in a staggered configuration, and the spacing between the respective optical fibers can be increased while shortening the length in the direction in which the respective optical fibers are lined up. As a result, the application of an excessive bending stress to the naked optical fibers can be prevented.

The tenth invention that is used to achieve the object described above is the ninth invention, wherein the optical axes of the respective light introduction or emission openings of the optical member are parallel to the axes of rotational symmetry of the lenses.

In this invention, the optical element can be formed as an entry-side telecentric optical system. Furthermore, if the optical element of the second invention or fifth invention is used as the optical element, the optical system can be formed as an entry-and exit-side telecentric optical system, so that an optical system with little aberration can be realized; furthermore, if the third invention or sixth invention is used, light can additionally be relayed with good efficiency in cases where the aperture angle of the waveguide and the aperture angle of the optical fibers are the same.

The eleventh invention that is used to achieve the object described above is the ninth or tenth invention, wherein the optical fibers that make up the optical fiber array are positioned by means of V grooves.

In the ninth or tenth invention, as was described above, the spacing of the optical fibers can be increased; accordingly, even if the naked optical fibers are fastened in place by means of V grooves as indicated in the prior art, the application of an excessive bending stress to the naked optical fibers can be prevented.

The twelfth invention that is used to achieve the object described above is the ninth or tenth invention, wherein the optical fiber array is connected to an MT connector, and the end surfaces of the optical fibers in the MT connector are disposed in positions where light is focused via the optical element.

MT connectors have been developed in order to connect optical fibers to each other, and are generally used for this purpose; one example of such a connector is described in "Fujikura Giho, No. 97, p. 22-27." If an MT connector is used, the end surfaces of optical fibers can easily be arranged in a uniform arrangement; furthermore, the naked optical fibers can be caused to face the optical element in a state in which excessive stress is reduced.

The thirteenth invention that is used to achieve the object described above is an optical element, wherein lenses each of which has at least the partial shape of a rotationally symmetrical surface, and in which the shape of this rotationally symmetrical surface is maintained in at least the region where the light beam used passes through are formed in a staggered configuration on one surface of a substrate so that the positions of adjacent lenses are shifted in one direction, and the other surface of the substrate is formed as a reflective surface that reflects the light that passes through the substrate.

Viewed in optical terms, this invention is equivalent to the first invention, except for the fact that the incident light is reflected by the reflective surface and emitted on the incident side. Accordingly, light that is incident in the same position in the y direction can be focused in the incident direction in a staggered state.

The fourteenth invention that is used to achieve the object described above is the thirteenth invention, wherein the thickness of the substrate is set so that the focal positions of the lenses and the reflective surface coincide.

This invention exhibits an operational effect equivalent to that of the third invention.

The fifteenth invention that is used to achieve the object described above is an optical element, wherein lenses each of which has at least the partial shape of a rotationally symmetrical surface, and in which the shape of this rotationally symmetrical surface is maintained in at least the region where the light beam used passes through are formed in a staggered configuration on one surface of a substrate so that the positions are shifted in one direction, and two unit optical elements each having these lenses formed thereon are joined with a half-mirror interposed so that the surfaces of these two unit optical elements on which the lenses are not formed contact each other, and so that the axes of rotational symmetry of the rotationally symmetrical surfaces formed on the unit optical elements coincide.

This invention exhibits an operational effect equivalent to that of the first invention with regard to the light that passes through the half-mirror, and exhibits an operational effect equivalent to that of the thirteenth invention with regard to the light that is reflected by the half-mirror.

The sixteenth invention that is used to achieve the object described above is the fifteenth invention, wherein the thickness of the substrates in the respective unit optical elements is set so that the focal positions of the lenses formed on the respective unit optical elements respectively coincide with the surfaces of the substrates on which the lenses are not formed.

This invention exhibits an operational effect equivalent to that of the second invention with regard to the light that passes through the half-mirror, and exhibits an operational effect equivalent to that of the thirteenth invention with regard to the light that is reflected by the half-mirror.

The seventeenth invention that is used to achieve the object described above is the sixteenth invention, wherein the focal distances of the lenses formed on the respective unit optical elements are equal to each other.

This invention exhibits an operational effect equivalent to that of the third invention with regard to the light that passes through the half-mirror, and exhibits an operational effect equivalent to that of the thirteenth invention with regard to the light that is reflected by the half-mirror.

The eighteenth invention that is used to achieve the object described above is any of the thirteenth through seventeenth inventions, wherein the lenses having the partial shape of a rotationally symmetrical surface have a length in the direction perpendicular to the direction of arrangement of the lenses that is long with respect to the width in the direction of arrangement of the lenses.

This invention exhibits the same operational effect as the eighth invention.

The nineteenth invention that is used to achieve the object described above is a waveguide in which at least one of the optical members forms a light path, wherein the optical element according to any one of claims 1 through 8 is used when the side of one light beam is taken as the upstream side, and the light path of the light is formed with a two-layer structure that is folded back at an intermediate point by causing the light from the upstream side to be incident on the staggered lenses so that the optical axis (principal rays) are on the same side with respect to the axes of rotational symmetry of two adjacent staggered lenses in the direction perpendicular to the direction of arrangement of the lenses, and also so that these coincide with the optical axes of the lenses in the direction of width of the lenses, and so that these are parallel to the optical axes of the lenses, and by folding back the output light so that from the opposite direction, the light is caused to be incident on one of the lenses of the optical element so that the optical axis (principal rays) are on the same side as the position where the light from the upstream side is incident with respect to the axis of rotational symmetry in the direction that is perpendicular to the direction of arrangement of the lenses, and also so that these coincide with the axes of rotational symmetry of the lenses in the direction of arrangement of the lenses, and so that these are parallel to the axes of rotational symmetry.

In this invention, the light from the upstream side is incident on the lenses of the optical element (e.g.) in every other lens, so that the focal positions are varied in the same direction. The focused light is received by the light path forming the waveguide, folded back, and caused to be incident on the optical element from the opposite direction. In this case, for example, the lenses on which the light is caused to be incident are lenses adjacent to the lenses through which the light has previously passed. Consequently, as a result of the action of the optical element, the focal point on the emission side is further shifted in the direction in which the position was previously altered. As a result of this focused light being received by the light path forming the waveguide, and conducted in a specified direction, a two-layer structure in which the light path is folded back can be formed. Accordingly, the waveguide can be made compact.

Furthermore, in the description given above, a case was described in which light was caused to be incident on every other lens, and the light was folded back and caused to be incident on the adjacent lenses. However, if the lenses on which light is caused to be incident, and the lenses on which light is folded back and caused to be incident are set as separate lenses, the combination of lenses can be arbitrarily selected.

BEST MODE FOR CARRYING OUT THE INVENTION

Figure 1:
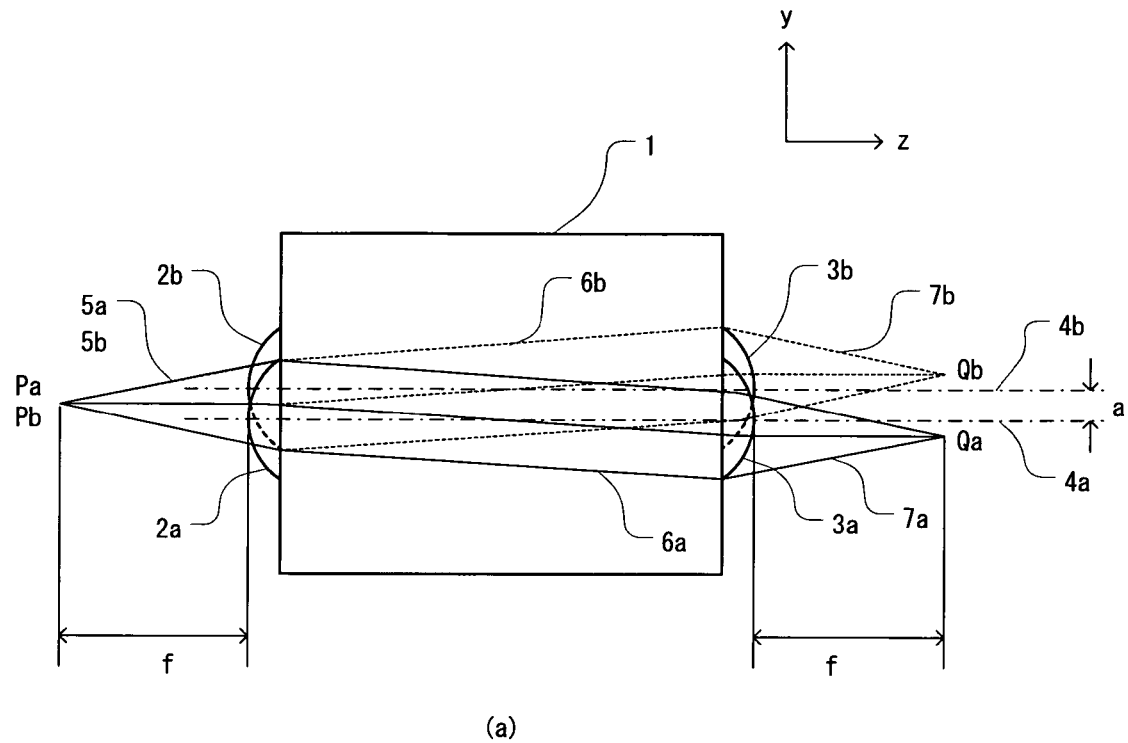
FIG. 1 is a diagram showing an outline of an optical element constituting a first working configuration of the present invention.
Figure 1:
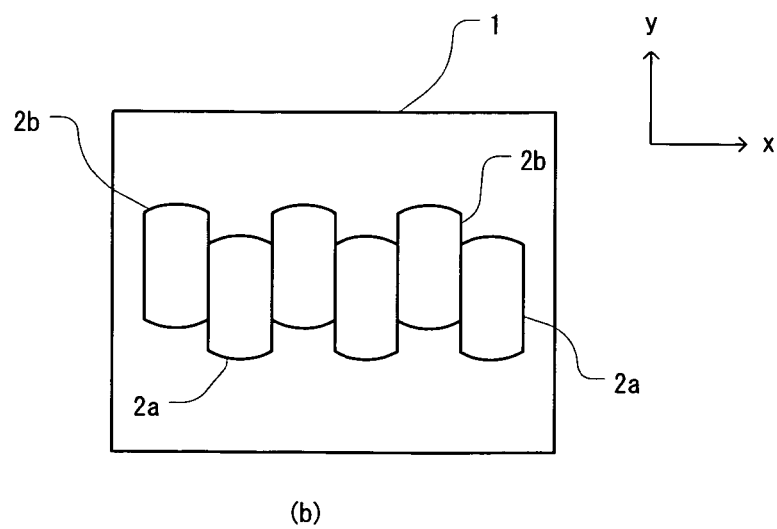

Working configurations of the present invention will be described below using the figures. FIG. 1 is a diagram showing an outline of an optical element constituting a first working configuration of the present invention. FIG. 1(a) is a side view, and FIG. 1(b) is a front view of FIG. 1(a) seen from the left side.

Lenses 2a and 2b are arranged in a staggered configuration so that the positions in the direction of the y axis are different as shown in FIG. 1(b) on one surface of a transparent substrate 1 made of quartz, glass, or the like (the surface on the left side in FIG. 1(a)) (in FIG. 1(b), symbols are assigned only to the lenses positioned on both ends).

Figure 2:
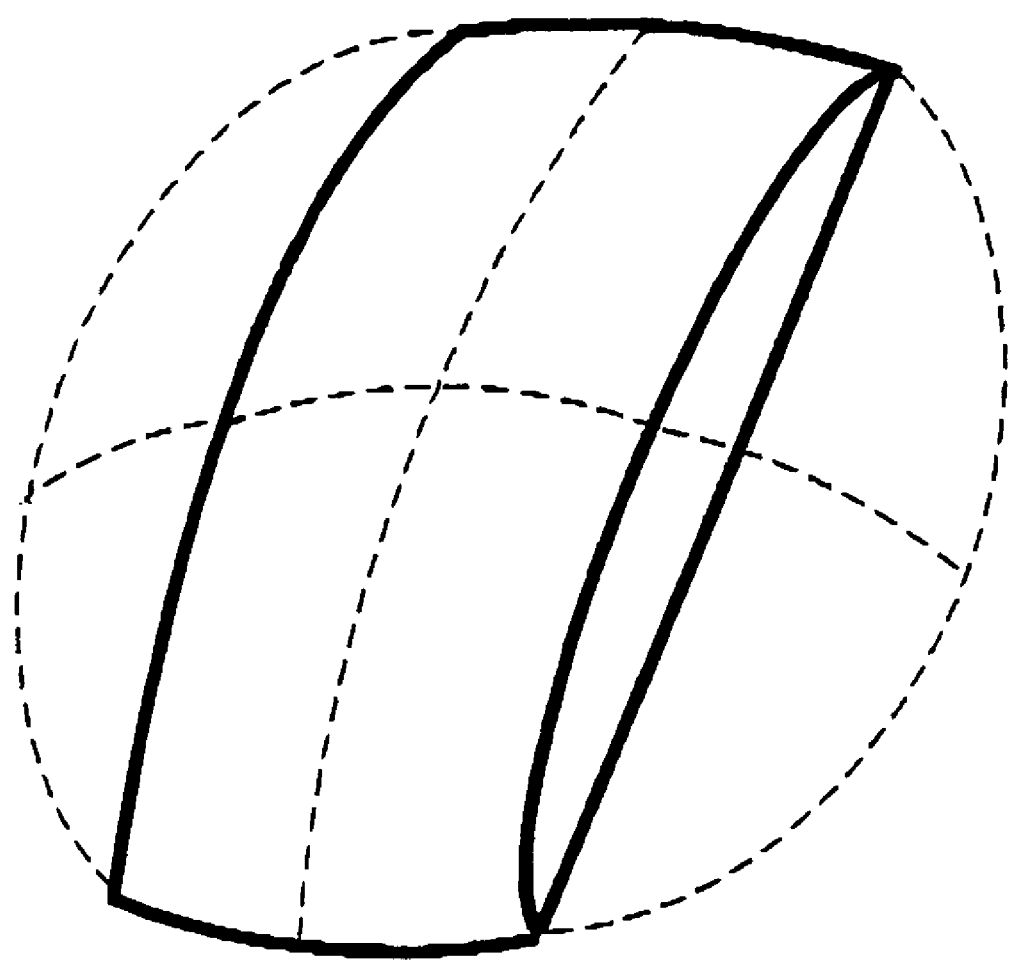
FIG. 2 is a diagram showing the shape of a lens strip used in a working configuration of the present invention.

As is shown in FIG. 2, the shape of these lenses 2a and 2b is that of a lens strip (indicated by a solid line) in which the optical surface is formed by cutting a rotationally symmetrical aspherical lens (indicated by a broken line) by two parallel planes. These lens strips have a shape which is such that the strips show planar symmetry with respect to the two parallel planes including the axes of rotational symmetry. Furthermore, these are lenses in which at least a portion of the rotationally symmetrical plane is present in the optical surface. The long direction of the lenses, i.e., the direction perpendicular to the optical axis and parallel to the cutting planes, is referred to as the "direction of length," and the short direction perpendicular to this, i.e., the normal direction of the two cutting planes, is referred to as the "direction of width." The reason that the lenses are cut in this way is to remove the excess portions through which the light beam does not pass, thus reducing the width of the lenses so that a concentrated disposition of the lenses is possible. Lenses having such a shape will be referred to below as "lens strips."

Meanwhile, lens strips 3a and 3b having a shape in which a rotationally symmetrical aspherical lens is cut as described above are also arranged in a staggered configuration on one surface (the right side surface in FIG. 1(a)) of the transparent substrate 1, so that the respective axes of rotationally symmetry (in the present specification and claims, these are called the "axes of rotational symmetry" of the lenses) of the original rotationally symmetrical aspherical surfaces of the shapes of the lens strips 2a and 3a are the same (4a). Similarly, the axes of rotational symmetry of the lens strips 2b and 3b are also the same (4b).

In this working configuration, the focal distances of all of the lens strips are the same, i.e., f, and the thickness of the substrate 1 is set so that the focal points of the lenses 2a and 3a forming a set are in the same position.

The spacing of the axes of rotational symmetry 4a and 4b in the y direction is set at a, and the light sources Pa and Pb are separated from the apices of the lens strips in the z direction by a distance of f, and are placed in an intermediate position between the axes of rotational symmetry 4a and 4b in the y direction. Furthermore, the x direction position of the light source Pa is the same as the centers of the lens strips 2a (the x direction position of the axis of rotational symmetry), and the x direction position of the light source Pb is the same as the centers of the lens strips 2b (the x direction position of the axis of rotational symmetry). Moreover, the principal rays of the light emitted from the light sources Pa and Pb are parallel to the axes of rotational symmetry 4a and 4b. That is, this optical system is an entry-side telecentric optical system.

Consequently, the light beam 5a emitted from the light source Pa becomes a parallel light beam 6a upon entering the substrate 1 as a result of the effect of the lens strips 2a. Furthermore, the principal rays intersect the axis of rotational symmetry 4a at a rear focal point of the lens strips 2a, which exist in the substrate 1.

The parallel light beam 6a reaches the emission-side end surface of the substrate 1, and is subjected to the effect of the lens strips 3a, so that this light is focused at the rear-side focal positions Qa (focal points) of the lens strips 3a. In this case, the principal ray of the parallel light beam 6a intersects the axis of rotational symmetry at a front focal point, which exist in the substrate 1 of the lens strips 3a; accordingly, the principal rays of the light beam 7a that is emitted from the lens strips 3a are parallel to the axis of rotational symmetry 4a. Specifically, this optical system is an exit-side telecentric optical system.

As is shown in the figures, the point where the principal rays of the light beam 5a are incident on the substrate 1 is shifted in the y direction by a distance of a/2 from the axis of rotational symmetry 4a. Accordingly, the parallel light beam 6a advances obliquely through the substrate 1 with respect to the axis of rotational symmetry 4a, so that the positions of the light source Pa and focal point Qa are shifted in the y direction. The amount of this shift can easily be calculated from the geometrical relationship, and is equal to a.

Similarly, the light beam 5b that is emitted from the light source Pb is also converted into a parallel light beam 6b inside the substrate 1 as a result of being subjected to the effect of the lens strips 2b, and is further formed into a light beam 7b and focused at the focal point Qb located in a position that is separated from the surface of the substrate 1 by a distance of f as a result of the effect of the lens strips 3b. This optical system is also an entry-and exit-side telecentric optical system. Furthermore, the point where the principal rays of the light beam 5b are incident on the substrate 1 is shifted by a distance of a/2 in the y direction from the axis of rotational symmetry 4a. Accordingly, the parallel light beam 6b advances obliquely through the substrate 1 with respect to the axis of rotational symmetry 4b, so that the positions of the light source Pb and focal point Qb are shifted in the y direction. The amount of this shift can easily be calculated from the geometrical relationship, and is equal to a; furthermore, the direction of this shift is the opposite direction from the direction of the focal point Qa.

Accordingly, the respective focal points Qa and Qb are arranged in a staggered configuration in which these focal points are shifted in the x direction by a distance equal to the spacing of the light sources Pa and Pb (equal to the distance between the centers of the lens strips 2a and 3a in the x direction and the centers of the lens strips 2b and 3b in the x direction), and are shifted in the y direction by a distance of 2a. Furthermore, the pitch of the focal points can also be expanded by an amount equal to the shift in the y direction. Accordingly, optical members with different pitches can be optically coupled to each other.

Thus, in cases where there are light sources lined up in a single row in a certain direction (the x direction in FIG. 1), light beams lined up in a single row can be converted into light beams arranged in a staggered configuration by using an optical element such as that shown in FIG. 1 in which lens strips having a staggered arrangement are formed on both surfaces of a substrate in correspondence with these light sources.

Figure 3:
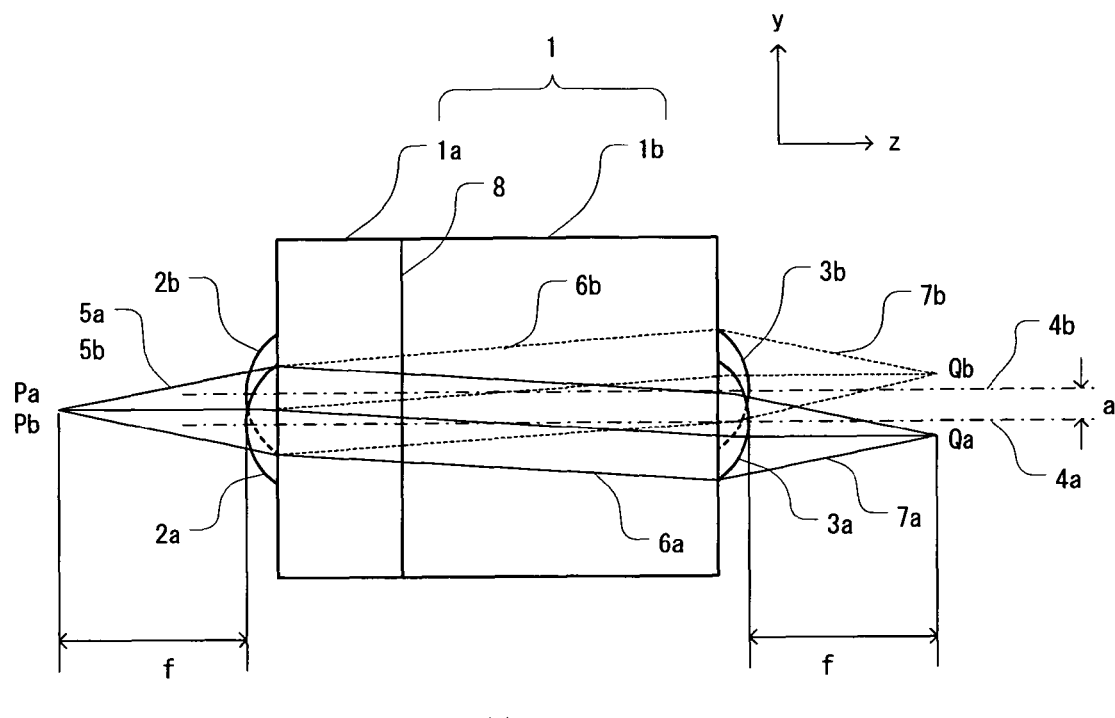
FIG. 3 is a diagram showing an outline of an optical element constituting a second working configuration of the present invention.
Figure 3:
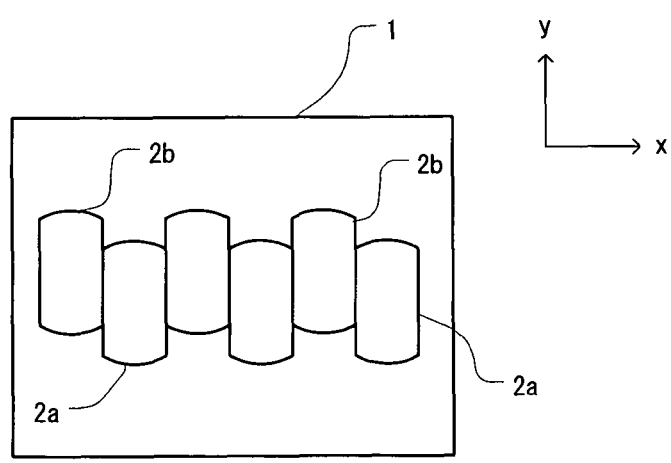

FIG. 3 is a diagram showing an outline of an optical element constituting a second working configuration of the present invention. FIG. 3(a) is a side view, and FIG. 3(b) is a front view seen from the left side of FIG. 3(a). In the following figures, constituent elements that are the same as constituent elements in the preceding figures will be labeled with the same symbols, and a description of these constituent elements may be omitted. The working configuration shown in FIG. 3 differs from the previous working configuration only in that the substrate 1 is divided into two unit substrates 1a and 1b, and these unit substrates are joined by a refractive index matching gel 8. Since it is clear that this working configuration is equivalent to the working configuration shown in FIG. 1, a further description is omitted.

In the working configuration shown in FIG. 1, the focal distances of all of the lens strips are the same, and the thickness of the substrate is; set to coincide with each focal point of the lens strips. Accordingly, a two-sided telecentric optical system can be formed, and the image forming magnification is 1, so that the aperture angle can be maintained. In this sense, this system may be viewed as the most ideal optical system. However, in cases where such conditions do not matter, some other construction may be used.

Figure 4:
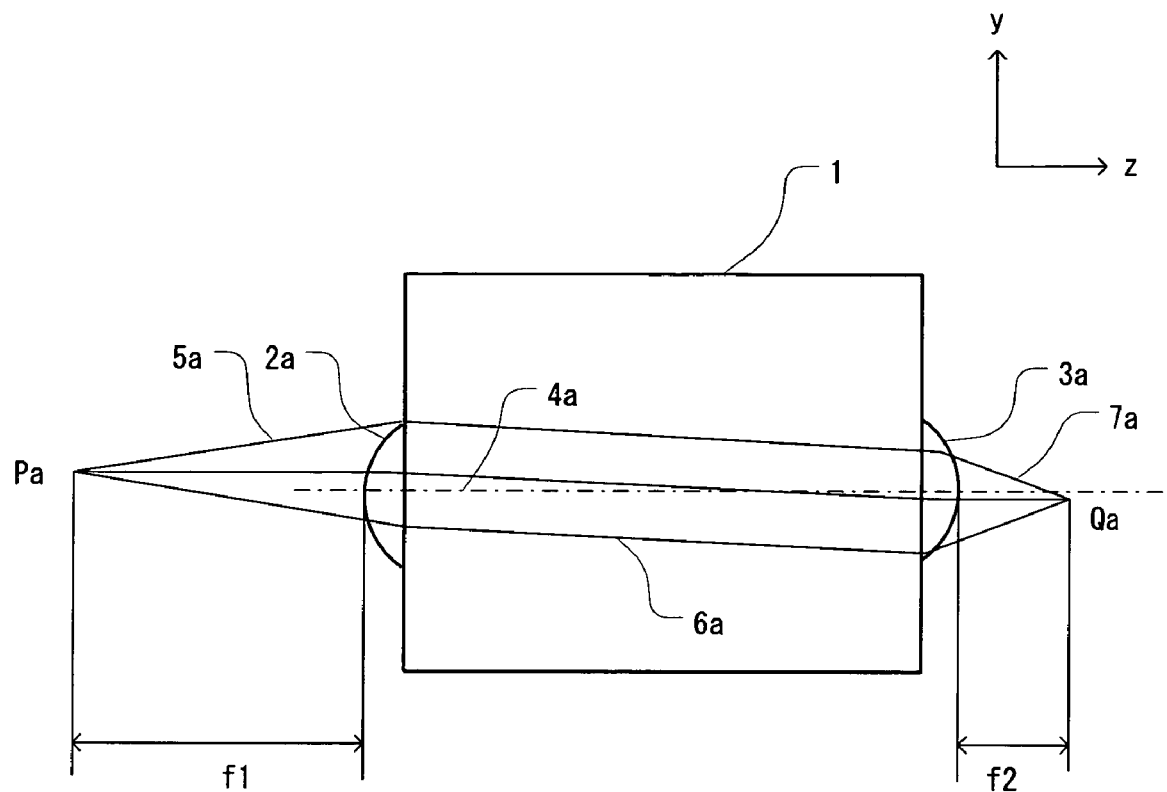
FIG. 4 is a diagram showing an outline of an optical element constituting a third working configuration of the present invention.

FIG. 4 is a diagram showing an outline of an optical element constituting a third working configuration of the present invention. In the following figures showing optical elements, unless otherwise stated, only one lens strip among the staggered lens strips is shown, and the optical elements are described as having only a single lens strip; in actuality, however, it goes without saying that the optical elements have staggered lens strips.

In the example shown in FIG. 4, the focal distance of the lens strips 2a and the focal distance of the lens strips 3a are different, and are respectively f1 and f2. However, the thickness of the substrate 1 is set so that both focal positions coincide. In this example as well, a two-sided telecentric optical system can be formed by placing the light source in a position that is separated from the apices of the lens strips by a distance of f1. However, the image forming magnification is f2/f1, so that the aperture angle also varies to f1/f2. From the geometrical relationship, the shift of the light source Pa and focal point Qa in the y direction is a×f2/f1. Here, as in FIG. 1, a is a value that is twice the spacing between the axis of rotational symmetry of the lens strips 2a and the optical axis (principal rays) of the incident light.

In all of the working configurations described above, the thickness of the substrate 1 is set so that the focal points of the respective lens strips formed on both sides coincide. However, it is not absolutely necessary to maintain such a relationship. In such cases, however, it is not possible to form the optical system as a two-sided telecentric optical system. In cases where the optical system is not a two-sided telecentric optical system, there is a problem in that the disposition of the optical fiber array and lens array becomes difficult.

Figure 5:
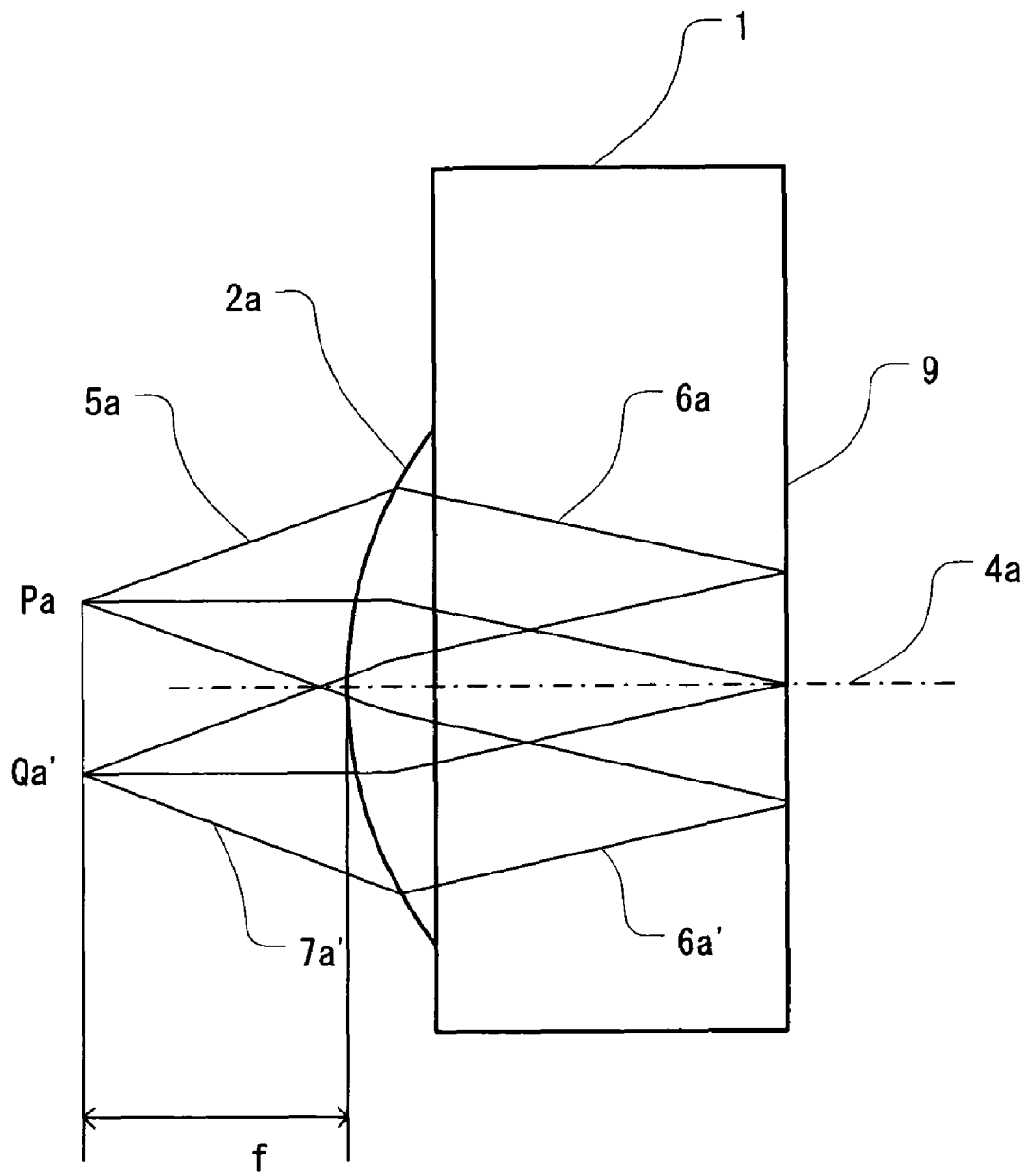
FIG. 5 is a diagram showing an outline of an optical element constituting a fourth working configuration of the present invention.

FIG. 5 is a diagram showing an outline of an optical element constituting a fourth working configuration of the present invention. In this working configuration, lens strips 2a are disposed on only one surface of the substrate 1, and a mirror 9 that reflects the light inside the substrate 1 is disposed on the other surface. The thickness of the substrate 1 is set so that the surface of the mirror 9 is located in the focal position of the lens strips 2a. The fact that the right half of the optical element shown in FIG. 1 is the same as a mirror image of this optical element requires no explanation.

Accordingly, the light rays leaving the light source Pa are formed into a parallel light beam 6a by the lens strips 2a. This light beam is reflected "as is" by the mirror 9 to form a parallel light beam 6a', which is again incident on the lens strips 2a so that a light beam 7a' is formed, and this light beam is focused at the focal point Qa'. Since the distance from the substrate 1 to the light source Pa is f, the telecentrically incident light is emitted telecentrically, and the image forming magnification is also 1. Accordingly, this optical system has an operational effect that is equivalent to that of the optical element shown in FIG. 1, except for the fact that the focal point Qa' is on the incident side.

Figure 6:
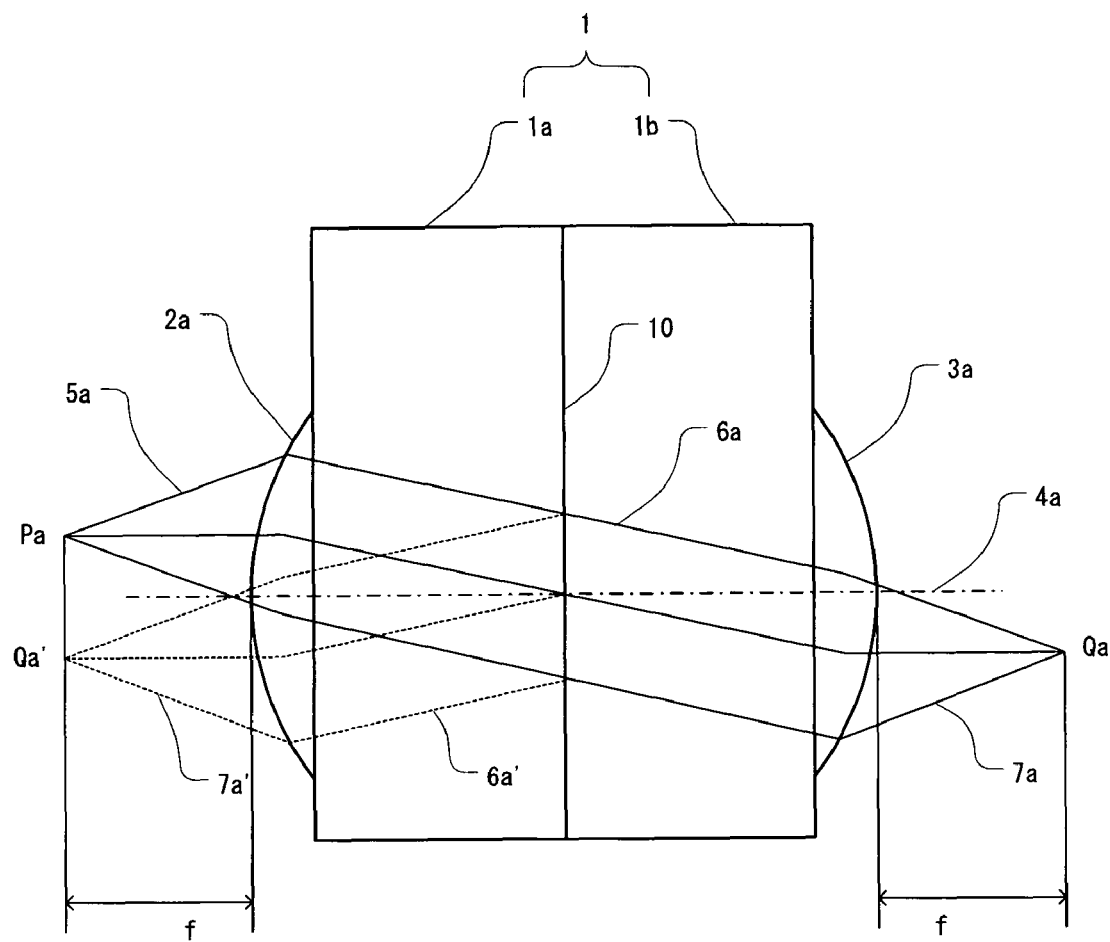
FIG. 6 is a diagram showing an outline of an optical element constituting a fifth working configuration of the present invention.

FIG. 6 is a diagram showing an outline of an optical element constituting a fifth working configuration of the present invention, and is a side view. In this working configuration, unit optical elements having the same shape are joined with a half-mirror 10 interposed. The respective unit optical elements have a unit substrate 1a and lens strips 2a, and a unit substrate 1b and lens strips 3a. The thicknesses of the unit substrates 1a and 1b are set so that the focal positions of the lens strips 2a and 3a and the surface of the half-mirror 10 coincide. The relationship with the light source is the same as the relationship shown in FIG. 1.

In such an optical element, the fact that the parallel light beam 6a passing through the half-mirror 10 shows the same behavior as that shown in FIG. 1, and is focused at the focal point Qa, while the light reflected by the half-mirror 10 shows the same behavior as that shown in FIG. 5, and is focused at the focal point Qa', requires no explanation. In this way, the light from light sources lined up in a row can be focused in a staggered state on both surfaces of the substrate 1.

Figure 7:
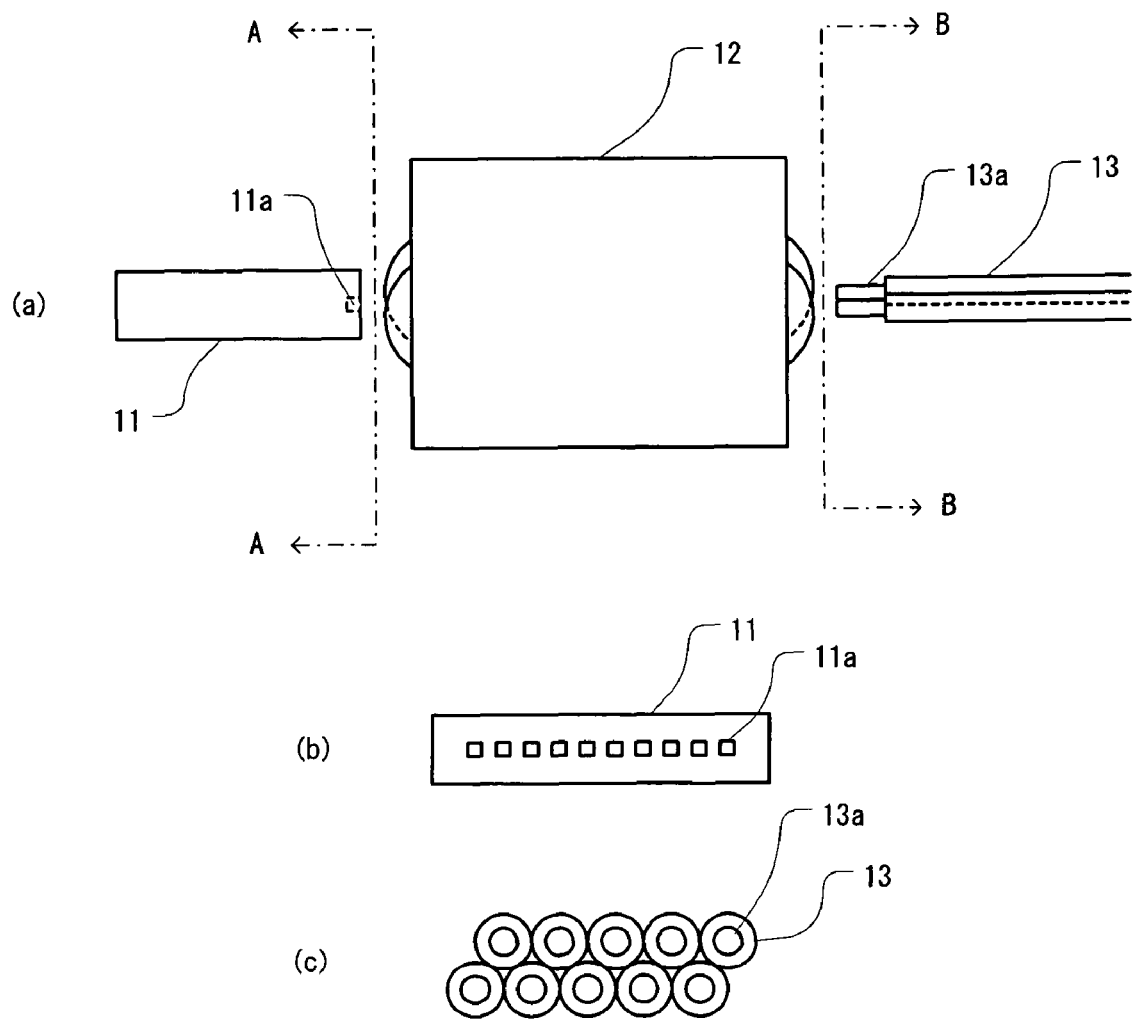
FIG. 7 is a diagram showing an outline of a relay optical system constituting a sixth working configuration of the present invention.

FIG. 7 is a diagram showing an outline of a relay optical system constituting a sixth working configuration of the present invention. This optical system uses the optical element shown in FIG. 1, and has the function of relaying light from a waveguide to an optical fiber array, or relaying light from an optical fiber array to a waveguide.

As is shown in FIG. 7(a), this optical system comprises a waveguide 11, an optical element 12 and a plurality of optical fibers 13. The light emitted from the light emission openings 11a of the waveguide 11 is focused on the end surfaces of the naked optical fibers 13a of the corresponding optical fibers 13 via the optical element 12, or a relay of the light rays following the opposite light path is performed.

FIG. 7(b) is a view from the arrows A-A in FIG. 7(a); here, a plurality of light emission openings 11a are lined up in a row in the waveguide 11. FIG. 7(c) is a view from the arrows B-B in FIG. 7(a); here, the optical fibers 13 are superimposed in two tiers in a stacked configuration so that the coverings overlap; as a result, the naked optical fibers 13a are arranged in a staggered configuration.

The respective light emission openings 11a are placed in positions corresponding to the light sources Pa and Pb in FIG. 1; meanwhile, the end surfaces of the naked optical fibers 13a are placed in positions corresponding to the focal points Qa and Qb in FIG. 1. Accordingly, the respective light emission openings 11a and the end surfaces of the corresponding naked optical fibers 13a can be relayed by the optical element 12.

In cases where the optical fibers 13 are thus superimposed, if the diameter of the coverings of the optical fibers 13 is b, then the arrangement pitch of the naked optical fibers 13a in the lateral direction is b/2. Consequently, the arrangement pitch of the light emission openings 11a of the waveguide 11 can also be set at b/2, thus reducing the size of the waveguide 11 effortlessly. Furthermore, in the conventional techniques described in Japanese Patent Application Laid-Open No. H10-246838 and Japanese Patent Application Laid-Open No. 2002-40284, the naked optical fibers are lined up laterally; since the diameter of the naked optical fibers is 125±1 μm, the pitch of the light emission openings of the waveguide is often set at 127 μm (allowing for a margin). In the present working configuration, however, since the naked optical fibers 13a are not arranged in a tightly adhering configuration, the element can be formed with an accurate pitch of 125 μm.

Figure 8:
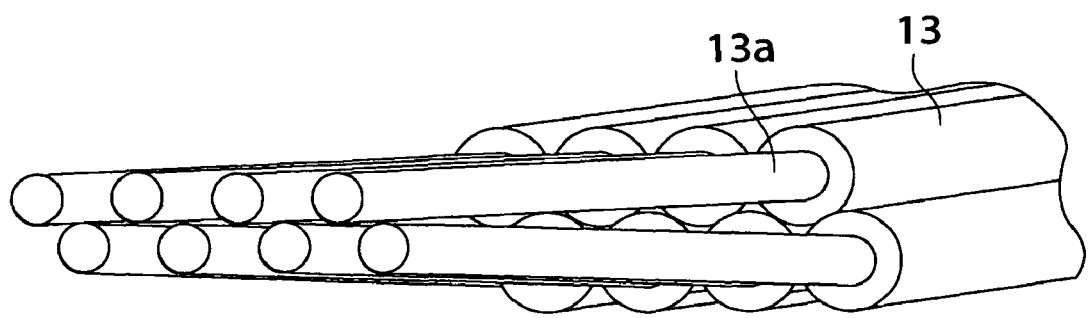
FIG. 8 is a diagram showing an example of a method for reducing the height occupied by the naked optical fibers.

In the arrangement shown in FIG. 7, assuming that the covering diameter of the optical fibers 13 is 250 μm and that the diameter of the naked optical fibers 13a is 125 μm, then the height occupied by the naked optical fibers 13a is (250× ($2/3^{1/2}$+½)) or 413 μm. In cases where this is to be reduced in size even further, the size can be reduced by arranging the naked optical fibers 13a with a small fold as shown in FIG. 8.

Figure 9:
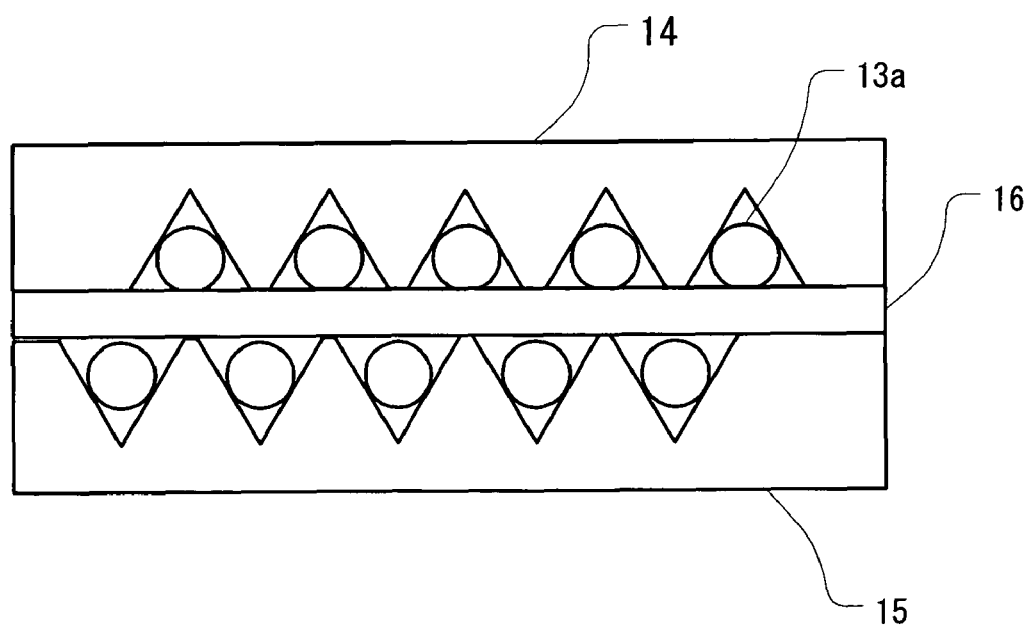
FIG. 9 is a diagram showing an example of a method using V grooves to fasten the naked optical fibers.

In such cases, the method for fastening the naked optical fibers 13a becomes an issue. The first method is a method using V grooves as in the prior art. An example of this method is shown in FIG. 9. Here, the naked optical fibers 13a are inserted into the V grooves of retaining plates 14 and 15 having such V grooves, and the naked optical fibers 13a are fastened in place by interposing and fastening a spacer 16 between the retaining plates 14 and 15. Specifically, the naked optical fibers 13a are constrained from three directions by the V grooves and spacer 16, so that these naked optical fibers 13a can be accurately positioned and fastened in place.

The second method used to fasten the naked optical fibers 13a is a method using an MT connector. As is indicated in "Fujikura Giho, No. 97, p. 22-27" described above, an MT connector can be manufactured as a two-dimensional arrangement type connector; accordingly, the naked optical fibers 13a can be simply fastened in place by arranging the optical fiber parts of the connector in a staggered configuration.

Figure 10:
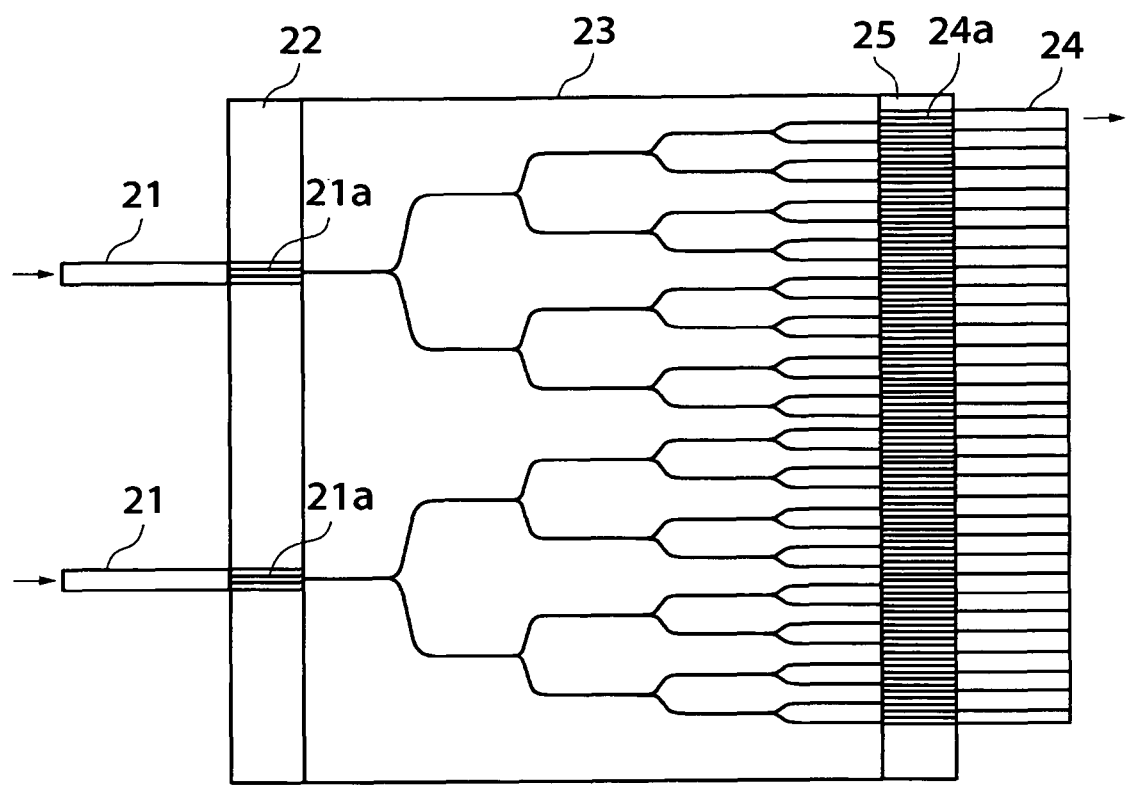
FIG. 10 is a diagram showing an outline of a conventional waveguide.

A waveguide constituting a working configuration of the present invention will be described below. FIG. 10 is a diagram showing an outline of a conventional waveguide. In optical fibers 21, naked optical fibers 21a in which the coverings are stripped from the tip end parts are connected to the waveguide 23 via V grooves 22. In the waveguide 23, the light path is branched as shown in the figure. On the exit side of the waveguide 23, the coverings on the tip end parts of the optical fibers 24 are stripped, so that naked optical fibers 24a are connected to the waveguide 23 via V grooves 25. This waveguide has the function of branching light that is incident from a single optical fiber 21 into 16 light beams. However, as is shown in the figure, a broad area is required.

Figure 11:
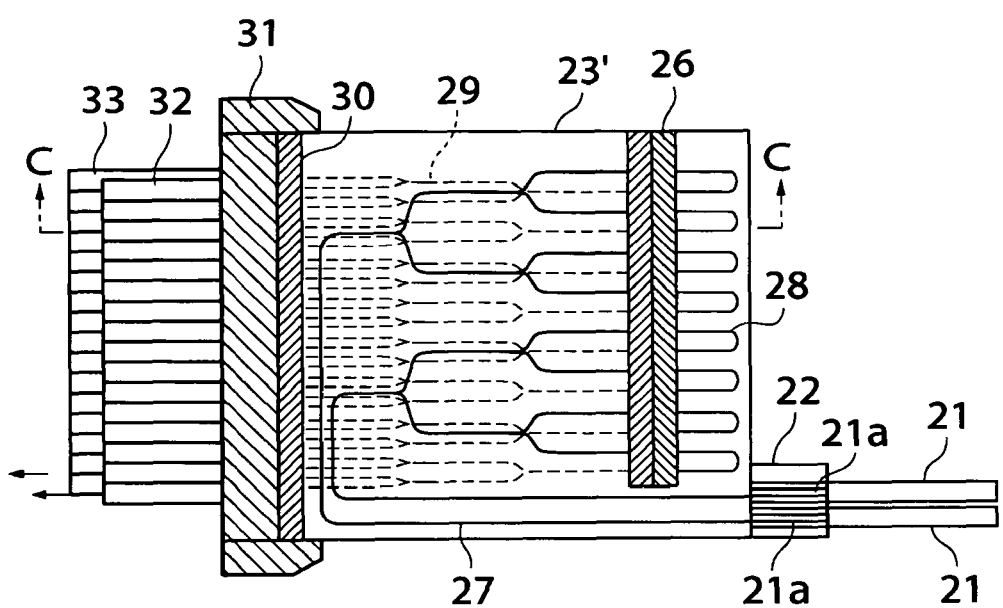
FIG. 11 is a diagram showing an outline of a waveguide constituting a working configuration of the present invention.
Figure 11:
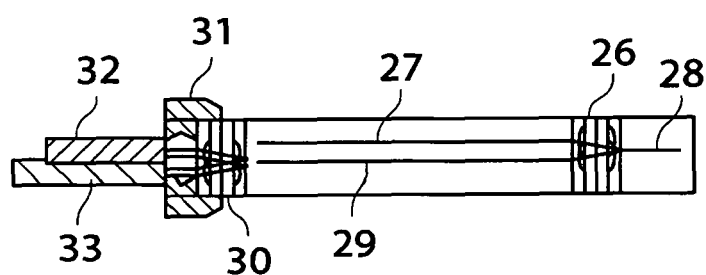

FIG. 11 is a diagram showing an outline of a waveguide constituting a working configuration of the present invention. FIG. 11(a) is a plan view, and FIG. 11(b) is a schematic sectional view along line C-C in FIG. 11(a). The naked optical fibers 21a on the tip end parts of the optical fibers 21 are connected to the waveguide 23' via V grooves. The light that is incident on the waveguide 23' is split into four parts by the light path 27, and is then incident on the optical element 26.

Furthermore, as will be described later, the light is focused on the back side (lower side in FIG. 11(b)) of the substrate of the waveguide 23' by the optical element, and is transmitted to the light path 28. Then, the light is folded back by the light path 28, and is incident on the optical element 26 from the opposite side. Then, as will be described later, the light is further focused on the back side of the substrate of the waveguide 23' by the optical element 26, and is transmitted to the light path 29.

In the light path 29, the light is further branched, and the branched light is incident on an optical element 30 of the type shown in FIG. 1. This light is focused in positions arranged in a staggered configuration, relayed by an MT connector 31 in which the tip ends of the naked optical fibers are disposed in the focal positions, and output from optical fibers 32 and 33 in two tiers. The relationship of the light path 29, optical element 30 and naked optical fibers of the MT connector 31 is as shown in FIG. 7, and the action of the optical element 30 is as shown in FIG. 1.

Figure 12:
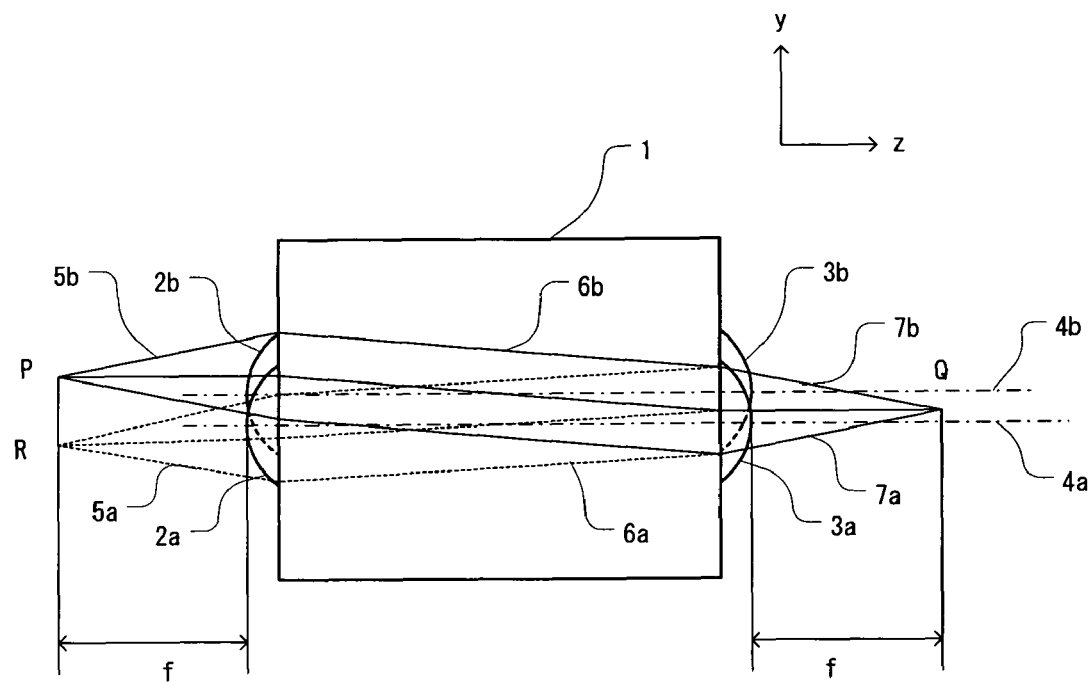
FIG. 12 is a diagram used to illustrate the effect of the optical element 26 in FIG. 11.

The effect of the optical element 26 will be described below using FIG. 12. The optical element 26 itself is the same as the optical element shown in FIG. 1; however, since the manner of causing the incidence of light is different, the light path differs from that shown in FIG. 1. The end part of the light path 27 constituting the light source is point P; here, unlike the example shown in FIG. 1, the light from point P is incident on the lens strips 2b. Furthermore, the y direction position of point P is higher than the axis of rotational symmetry 4a or 4b of either the lens strips 2a or 2b. Accordingly, the light beam 5b that is emitted from point P is formed into a parallel light beam 6b inside the substrate 1 by the effect of the lens strips 2b, and proceeds downward through the substrate 1. Then, this light beam is formed into a light beam 7b by the effect of the lens strips 3b, and is focused at the focal point Q.

One end of the light path 28 is positioned at the focal point Q. The light path 28 has the role of bending this light and emitting the light toward the lens strips 3a from point Q', whose z direction and y direction positions are the same as those of point Q. The x direction position of point Q' is the same as the x direction position of the axis of rotational symmetry of the lens strips 3a.

The y direction position of point Q' is in the same direction as point P with respect to the axis of rotational symmetry 4a. Accordingly, the light beam 7a that is emitted from point Q' is formed into a parallel light beam 6a inside the substrate 1 by the effect of the lens strips 3a, and proceeds downward through the substrate 1. Then, this light beam is formed into a light beam 5a by the effect of the lens strips 2a, and is focused at the focal point R. The end surface of the light path 29 is positioned at the focal point R. Specifically, the optical element 26 acts in conjunction with the light path 28, and has the role of inverting the light path and lowering the light path to the bottom of FIG. 12. As a result of such an effect, the branched light path of the waveguide 23' can be formed into two layers in FIG. 11. Consequently, the size of the waveguide 23' can be reduced.

Furthermore, in this example, waveguides are installed on both sides of the optical element 26, and one of these waveguides is formed as a waveguide with a two-layer structure. This optical element can also be used in various methods besides being used to connect optical fibers.

Figure 13:
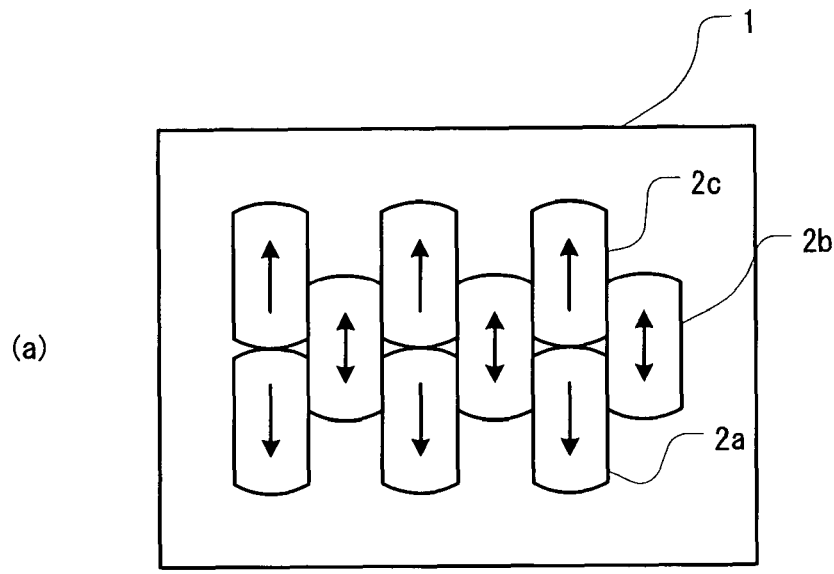
FIG. 13 is a diagram showing a modified example of the working configurations shown in FIGS. 1 through 6.
Figure 13:
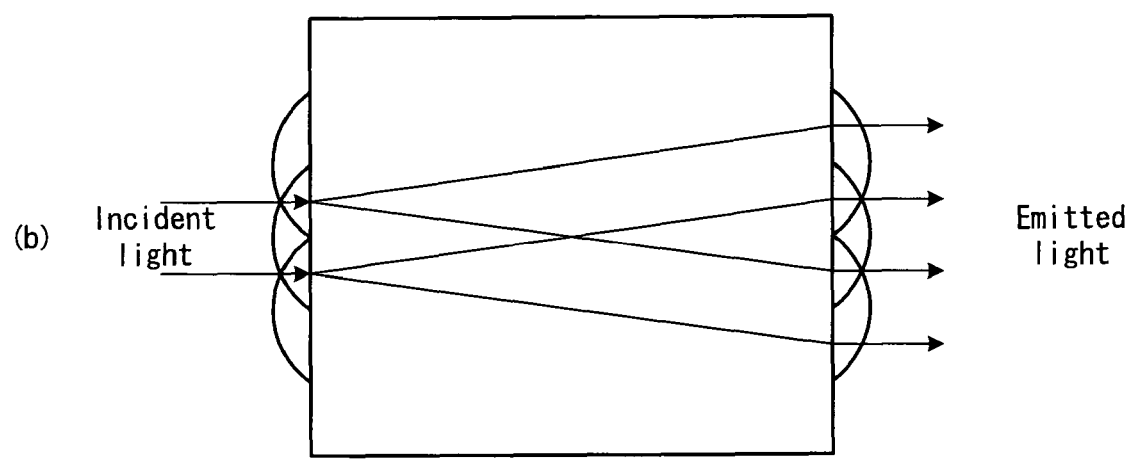

Furthermore, FIG. 13 shows a modified example of the working configurations shown in FIGS. 1 through 6. FIG. 13(a) is a diagram showing an optical element corresponding to the optical elements shown in FIGS. 1 through 6 as seen from the left side in FIGS. 1 through 6. In this figure, besides the staggered lens strips 2a and 2b, there are also lens strips 2c which are staggered with respect to lens strips 2b, and in which the x direction position of the axis of rotational symmetry coincides with the lens strips 2a. As is shown in FIG. 13(b), lens strips corresponding to FIGS. 1 through 4 and FIG. 6 are installed in the same positions on the opposite surface of the substrate 1.

In such an optical element, the position of the light can be altered to the position of the tip end of the arrow symbol when light is incident on the root of the arrow symbol in the lens strips 2a and 2c, and the position of the light can be altered to the position of the other tip end when the light is incident on one tip end of the arrow symbol in the lens strips 2b. Accordingly, light incident in two rows can be altered to light that is staggered in four rows. Thus, if the number of tiers of staggered lens strips is increased, a correspondingly larger number of rows of light can be altered to light that is arranged in a staggered configuration. It goes without saying that such an optical element is also included in the scope of the present invention.

Moreover, lens strips were used in these working configurations; however, as long as the lenses used are lenses in which a specified rotationally symmetrical aspherical surface shape is left only in the portions through which the light beams from the optical fibers or the like pass, and the other portions are cut away, lenses with an arbitrary shape may be used, or rotationally symmetrical aspherical lenses may be used "as is." In any case, when such lenses are used in pairs, the system is arranged so that the axes of rotational symmetry of the paired lenses are the same, and in cases where the light beam is folded back by a reflective surface, the system is arranged so that the relationship between the reflective surface and the light beam is perpendicular.

In addition, in the working configurations described above, a construction was used in which lenses were disposed on the surface of a substrate. However, these lenses may also be lenses in which lenses consisting of a synthetic resin having substantially the same refractive index as the substrate are formed on the surface of the substrate so that this resin adheres tightly to the substrate. Alternatively, lens shapes may be formed on the substrate surface using a resist or the like, and the lens shapes of the resist can then be transferred to the substrate by etching the substrate and resist together, thus forming the substrate surface into lens shapes. Thus, lenses disposed on the surface of the substrate can be formed by publicly known arbitrary methods.

The invention claimed is:

1. An optical element comprising:
a substrate; and
a plurality of pairs of lenses, each of the lenses being shaped as at least a part of a rotationally symmetric surface having an axis of rotational symmetry;
wherein each of the pairs of lenses comprises two paired lenses provided on two opposed surfaces of the substrate, respectively, such that the axes of rotational symmetry of the two lenses are the same; and
wherein on each of the two opposed surfaces of the substrate, the lenses of the plurality of pairs of lenses are arranged such that intersection points of the axes of rotational symmetry of the lenses with the surface on which the lenses are provided are in a staggered configuration.

2. The optical element according to claim 1, wherein a distance between the two opposed surfaces of the substrate is set so that in each of the pairs of lenses focal positions of the two paired lenses coincide with each other.

3. The optical element according to claim 2, wherein in each of the pairs of lenses focal distances of the two paired lenses are equal.

4. The optical system element according to claim 1, wherein the shape of the rotationally symmetrical surface is expressed by Equation (1) below:

$$z = \frac{r^2/R}{1 + \sqrt{1-(1+\kappa)\cdot r^2/R^2}} \quad (1)$$

where:
r is a distance in a direction perpendicular to the axis of rotational symmetry;
z is an amount of sag in a direction of an optical axis of an aspherical surface;
R is a curvature radius of an apex of the aspherical surface; and
K is a conical coefficient and is less than −1.

5. The optical element according to claim 1, wherein on each of the two opposed surfaces of the substrate, the lenses of the plurality of pairs of lenses are arranged to be adjacent to each other along an arrangement direction; and
wherein each of the lenses of the plurality of pairs of lenses has a length in a direction perpendicular to the arrangement direction that is longer than a width of the lens in the arrangement direction.

6. An optical system comprising:
an optical member having light introduction or emission openings lined up in a single row;
an optical fiber array in which optical fibers have a diameter that is greater than a pitch of the light introduction or emission openings of the optical member; and
the optical element according to claim 1, installed between the optical member and the optical fiber array;
wherein:
on each of the two opposed surfaces of the substrate of the optical element, the lenses of the plurality of pairs of lenses are arranged to be adjacent to each other along an arrangement direction;
the light introduction or emission openings of the optical member are disposed to correspond respectively to the lenses on one of the two opposed surfaces of the substrate;
positions of respective optical axes of the light introduction or emission openings of the optical member coincide positions of centers of the corresponding lenses along the arrangement direction;
the positions of the respective optical axes of the light introduction or emission openings of the optical member are located, along a direction perpendicular to the arrangement direction, between the axes of rotational symmetry of two adjacent lenses among the lenses arranged in the staggered configuration on said one of the two opposed surfaces of the substrate of the optical element;
the light introduction or emission openings of the optical member are disposed at respective positions that are separated from the corresponding lenses by a focal distance of the lenses;
the optical fibers in the optical fiber array are staggered in two tiers corresponding to the lenses on the other of the two opposed surfaces of the substrate of the optical element; and
an end surface of the optical fiber array is disposed at a position where light emitted from the waveguide is focused via the optical element.

7. The optical system according to claim 6, wherein the respective optical axes of the light introduction or emission openings of the optical member are parallel to the axes of rotational symmetry of the lenses.

8. The optical system according to claim 6, wherein the optical fibers of the optical fiber array are positioned by V grooves.

9. The optical system according to claim 6, wherein the optical fiber array is connected to an MT connector, and end surfaces of the optical fibers in the MT connector are disposed at positions where light is focused via the optical element.

10. A waveguide comprising:
at least one optical member forming a light path; and
the optical element according to claim 1;
wherein a side of one light beam is taken as an upstream side of the waveguide;
wherein on each of the two opposed surfaces of the substrate of the optical element, the lenses of the plurality of pairs of lenses are arranged to be adjacent to each other along an arrangement direction; and
wherein the waveguide has a structure such that the light path is formed with a two-layer structure that is folded back at an intermediate point by:
causing light from the upstream side to be incident on the lenses on one of the two opposed surfaces of the substrate of the optical element so that optical axes of the light incident on the lenses are (i) on a same side with respect to the axes of rotational symmetry of two adjacent staggered lenses in a direction perpendicular to the arrangement direction, (ii) located at positions which coincide in the arrangement direction with positions of the axes of rotational symmetry of the lenses on which the light is incident, and (iii) parallel to the axes of rotational symmetry of the lenses; and
folding back light output from the optical element so that the light is caused to be incident on the lenses on the other of the two opposed surfaces of the substrate of the optical element so that optical axes of the light incident on the lenses are (i) in a same positional relationship as a position where the light from the upstream side is incident with respect to the axes of rotational symmetry of two adjacent staggered lenses in the direction perpendicular to the arrangement direction, (ii) located at positions which coincide in the arrangement direction with positions of the axes of rotational symmetry of the lenses on which the light is incident, and (iii) parallel to the axes of rotational symmetry of the lenses.

11. An optical element comprising:

a first unit optical element; and a second unit optical element;

wherein the first unit optical element comprises: (i) a substrate having a first surface and a second surface opposed to the first surface, and (ii) a plurality of lenses provided on a first surface of the substrate, each of the lenses being shaped as at least a part a rotationally symmetrical surface having an axis of rotational symmetry, wherein the plurality of lenses are arranged on the first surface such that intersection points of the axes of rotational symmetry of the lenses with the first surface are in a staggered configuration;

wherein the second unit optical element comprises: (i) a substrate having a first surface and a second surface opposed to the first surface, and (ii) a plurality of lenses provided on a first surface of the substrate, each of the lenses being shaped as at least a part a rotationally symmetrical surface having an axis of rotational symmetry, wherein the plurality of lenses are arranged on the first surface such that intersection points of the axes of rotational symmetry of the lenses with the first surface are in a staggered configuration; and wherein the first unit optical element and the second unit optical element are joined with the respective second surfaces thereof brought into contact, in such a way that the axis of rotational symmetry of each of the lenses of the first unit optical element coincides with the axis of rotational symmetry of a corresponding one of the lenses of the second unit optical element.

12. The optical element according to claim 11, wherein a sum of a distance between the first surface and the second surface of the first unit optical element and a distance between the first surface and the second surface of the second unit optical element is set so that focal positions of the lenses with coinciding axes of rotational symmetry coincide with each other.

13. The optical element according to claim 12, focal distances of the lenses with coinciding axes of rotational symmetry are equal.

14. The optical system element according to claim 11, wherein the shape of the rotationally symmetrical surface is expressed by Equation (1) below:

$$z = \frac{r^2/R}{1 + \sqrt{1 - (1+\kappa) \cdot r^2/R^2}} \quad (1)$$

where:

r is a distance in a direction perpendicular to the axis of rotational symmetry;

z is an amount of sag in a direction of an optical axis of an aspherical surface;

R is a curvature radius of an apex of the aspherical surface; and

K is a conical coefficient and is less than −1.

15. The optical element according to claim 11, wherein on each of the first surfaces, the lenses are arranged to be adjacent to each other along an arrangement direction; and wherein each of the lenses has a length in a direction perpendicular to the arrangement direction that is longer than a width of the lens in the arrangement direction.

16. An optical system comprising:

an optical member having light introduction or emission openings lined up in a single row;

an optical fiber array in which optical fibers have a diameter that is greater than a pitch of the light introduction or emission openings of the optical member; and the optical element according to claim 11, installed between the optical member and the optical fiber array;

wherein:

on each of the first surfaces, the lenses are arranged to be adjacent to each other along an arrangement direction;

the light introduction or emission openings of the optical member are disposed to correspond respectively to the lenses on one of the first surfaces;

positions of respective optical axes of the light introduction or emission openings of the optical member coincide positions of centers of the corresponding lenses along the arrangement direction;

the positions of the respective optical axes of the light introduction or emission openings of the optical member are located, along a direction perpendicular to the arrangement direction, between the axes of rotational symmetry of two adjacent lenses among the lenses arranged in the staggered configuration on said one of the first surfaces;

the light introduction or emission openings of the optical member are disposed at respective positions that are separated from the corresponding lenses by a focal distance of the lenses;

the optical fibers in the optical fiber array are staggered in two tiers corresponding to the lenses on the other of the first surfaces; and an end surface of the optical fiber array is disposed at a position where light emitted from the waveguide is focused via the optical element.

17. The optical system according to claim 16, wherein the respective optical axes of the light introduction or emission openings of the optical member are parallel to the axes of rotational symmetry of the lenses.

18. The optical system according to claim 16, wherein the optical fibers of the optical fiber array are positioned by V grooves.

19. The optical system according to claim 16, wherein the optical fiber array is connected to an MT connector, and end surfaces of the optical fibers in the MT connector are disposed at positions where light is focused via the optical element.

20. A waveguide comprising:

at least one optical member forming a light path; and the optical element according to claim 11;

wherein a side of one light beam is taken as an upstream side of the waveguide;

wherein on each of the first surfaces, the lenses are arranged to be adjacent to each other along an arrangement direction; and wherein the waveguide has a structure such that the light path is formed with a two-layer structure that is folded back at an intermediate point by:

causing light from the upstream side to be incident on the lenses on one of the first surfaces so that optical axes of the light incident on the lenses are (i) on a same side with respect to the axes of rotational symmetry of two adjacent staggered lenses in a direction perpendicular to the arrangement direction, (ii) located at positions which coincide in the arrangement direction with positions of the axes of rotational symmetry of the lenses on which the light is incident, and (iii) parallel to the axes of rotational symmetry of the lenses; and folding back light output from the optical element so that the light is caused to be incident on the lenses on the other of the first surfaces so that optical axes of the light incident on the lenses are (i) in a same positional relationship as a position where the light from the upstream side is incident with respect to the axes of rotational symmetry of two adjacent staggered lenses in the direction perpendicular to the arrangement direction, (ii) located at positions which coincide in the arrangement direction with positions of the axes of rotational symmetry of the lenses on which the light is incident, and (iii) parallel to the axes of rotational symmetry of the lenses.

21. An optical element comprising:

a substrate having a first surface and a second surface opposed to the first surface; and a plurality of lenses provided on the first surface of the substrate, each of the lenses being shaped as at least a part a rotationally symmetrical surface having an axis of rotational symmetry;

wherein the second surface of the substrate is a reflective surface that reflects the light that passes through the substrate; and wherein the plurality of lenses are arranged on the first surface such that intersection points of the axes of rotational symmetry of the lenses with the first surface are in a staggered configuration.

22. The optical element according to claim 21, wherein a distance between the first surface and the second surface is set so that focal positions of the lenses coincide with the reflective surface.

23. The optical element according to claim 21, wherein the lenses are arranged on the first surface to be adjacent to each other along an arrangement direction; and wherein each of the lenses has a length in a direction perpendicular to the arrangement direction that is longer than a width of the lens in the arrangement direction.

24. An optical element comprising:

a first unit optical element; and a second unit optical element;

wherein the first unit optical element comprises: (i) a substrate having a first surface and a second surface opposed to the first surface, and (ii) a plurality of lenses provided on a first surface of the substrate, each of the lenses being shaped as at least a part a rotationally symmetrical surface having an axis of rotational symmetry, wherein the plurality of lenses are arranged on the first surface such that intersection points of the axes of rotational symmetry of the lenses with the first surface are in a staggered configuration;

wherein the second unit optical element comprises: (i) a substrate having a first surface and a second surface opposed to the first surface, and (ii) a plurality of lenses provided on a first surface of the substrate, each of the lenses being shaped as at least a part a rotationally symmetrical surface having an axis of rotational symmetry, wherein the plurality of lenses are arranged on the first surface such that intersection points of the axes of rotational symmetry of the lenses with the first surface are in a staggered configuration; and wherein the first unit optical element and the second unit optical element are joined with a half-mirror interposed between the respective second surfaces thereof, in such a way that the axis of rotational symmetry of each of the lenses of the first unit optical element coincides with the axis of rotational symmetry of a corresponding one of the lenses of the second unit optical element.

25. The optical element according to claim 24, wherein a distance between the first surface and the second surface of the first unit optical element is set such that focal positions of the lenses of the first unit optical element coincide with the second surface of the first unit optical element; and wherein a distance between the first surface and the second surface of the second unit optical element is set such that focal positions of the lenses of the second unit optical element coincide with the second surface of the second unit optical element.

26. The optical element according to claim 25, focal distances of the lenses of the first unit optical element and the second unit optical element are equal.

27. The optical element according to claim 24, wherein on each of the first surfaces, the lenses are arranged to be adjacent to each other along an arrangement direction; and wherein each of the lenses has a length in a direction perpendicular to the arrangement direction that is longer than a width of the lens in the arrangement direction.

* * * * *